United States Patent [19]

Köhler

[11] Patent Number: 4,944,588
[45] Date of Patent: Jul. 31, 1990

[54] SYSTEM FOR DETECTING LASER RADIATION

[75] Inventor: Ludwig Köhler, Walldorf, Fed. Rep. of Germany

[73] Assignee: Eltro GmbH, Heidelberg, Fed. Rep. of Germany

[21] Appl. No.: 125,592

[22] Filed: Nov. 25, 1987

[30] Foreign Application Priority Data

Nov. 27, 1986 [DE] Fed. Rep. of Germany ....... 3640946

[51] Int. Cl.⁵ ............................. G01C 1/00; H01J 3/14
[52] U.S. Cl. ..................................... 356/152; 356/141; 250/237 R; 250/339; 250/342; 250/349
[58] Field of Search ................. 356/141, 152; 250/237 R, 203 R, 339, 332, 342, 349

[56] References Cited

U.S. PATENT DOCUMENTS

| | | | |
|---|---|---|---|
| H192 | 1/1987 | Daehler | 356/152 |
| H412 | 1/1988 | Miller, Jr. et al. | 250/203 R |
| 3,059,120 | 10/1962 | Anthony et al. | 250/203 R |
| 3,188,472 | 6/1965 | Whipple, Jr. | 250/203 R |
| 3,287,562 | 11/1966 | Connors, Jr. et al. | 250/203 R |
| 3,304,425 | 2/1967 | Astheimer | |
| 3,448,273 | 6/1969 | Webb | 250/203 R |
| 3,611,385 | 10/1971 | McHenry | |
| 4,000,356 | 2/1977 | Johnson et al. | 250/203 R |
| 4,081,669 | 3/1978 | Klingman, III | 356/152 X |
| 4,225,781 | 9/1980 | Hammons | 356/152 X |
| 4,651,001 | 3/1987 | Harada et al. | 250/339 X |

FOREIGN PATENT DOCUMENTS

| | | |
|---|---|---|
| 2031971 | 4/1972 | Fed. Rep. of Germany . |
| 2830308 | 7/1978 | Fed. Rep. of Germany . |
| 1522467 | 3/1968 | France . |
| 2239176 | 8/1977 | France . |
| 2454628 | 11/1980 | France . |

Primary Examiner—Thomas H. Tarcza
Assistant Examiner—Linda J. Wallace
Attorney, Agent, or Firm—Michael N. Meller

[57] ABSTRACT

An alarm system for military objects of a laser-radiating hostile weapon system. A plurality of units for detecting impinging laser radiation are mounted on an airplane, for example. Each detection unit is arranged to detect in one of six directions along three mutually perpendicular axes. The detection units are coupled to output signals representing the direction of incoming laser radiation to processing electronics. Each detection unit has an array of detector elements in a first plane and a diaphragm equal in size to the array in a second plane parallel to the first plane. The diaphragm and array are arranged so that the direction of the laser radiation can be determined from the pattern of detector elements activated in response to laser radiation passing through the diaphragm.

17 Claims, 5 Drawing Sheets

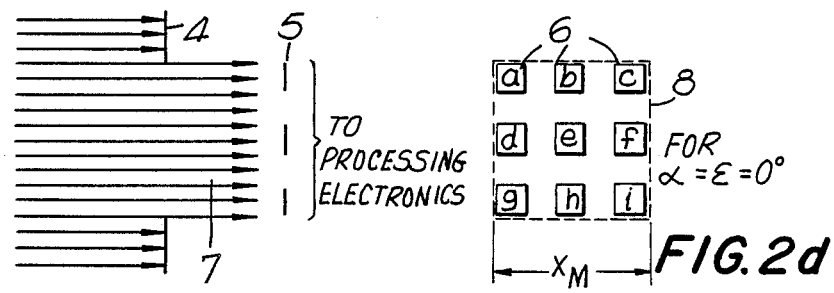
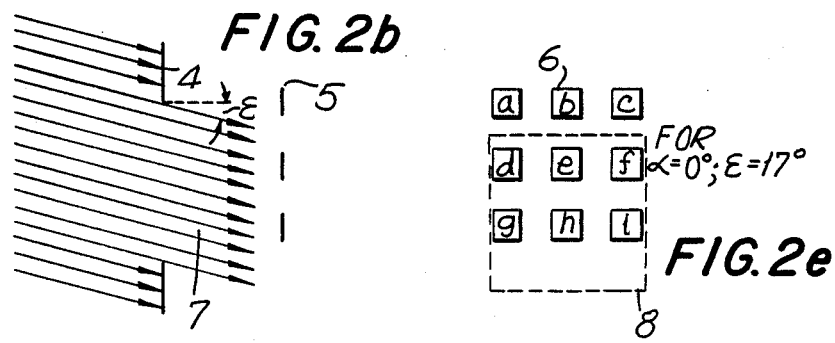
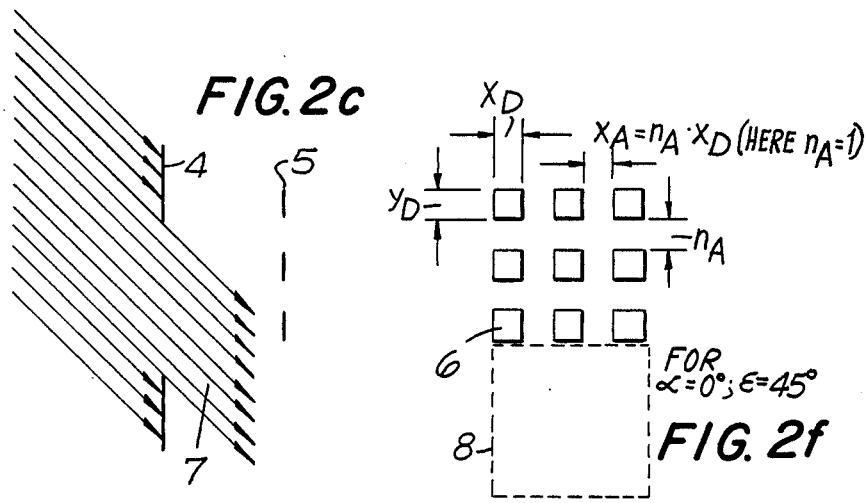

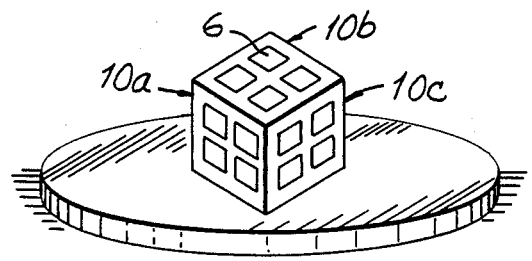
FIG. 5
FIG. 6
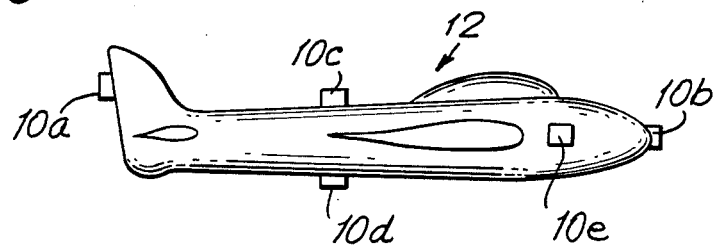
FIG. 7
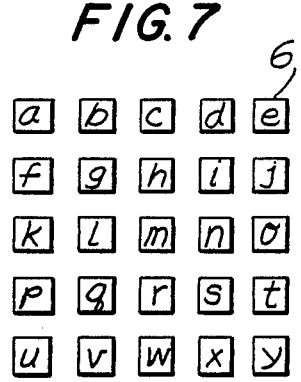

SYSTEM FOR DETECTING LASER RADIATION

FIELD OF THE INVENTION

The invention relates to an alarm system for military objects for dectecting laser-radiating hostile weapon systems.

Such a detection system is shown in DE-AS No. 2852224 for the visible and near-IR region, that is, for an Nd-YAG laser with a wavelength of 1.06 microns.

The object of the invention is to improve the known system to discriminate the greatest number of solid angle intervals with the fewest possible individual detector elements and a space-saving concept.

A plurality of units for detecting impinging laser radiation are mounted on an airplane, for example. Each detection unit is arranged to detect in one of six directions along three mutually perpendicular axes. The detection units are coupled to output signals representing the direction of incoming laser radiation to processing electronics. Each detection unit has an array of detector elements in a first plane and a diaphragm equal in size to the array in a second plane parallel to the first plane. The diaphragm and array are arranged so that the direction of the laser radiation can be determined from the pattern of detector elements activated in response to laser radiation passing through the diaphragm.

By such an arrangement, the employment of a lens can be avoided, thereby resulting in an economic and space-saving construction.

BRIEF DESCRIPTION OF THE DRAWINGS

The preferred embodiments of the invention will be described in detail with reference to the drawings, wherein:

FIGS. 2a–2c are side views of the laser radiation, diaphragm and detector array (left-hand side) and front views of the array and cross section of the laser radiation (right-hand side) for different angles of incidence.

FIG. 5 shows a perspective view of a plurality of detection units arranged on a cube.

FIG. 6 shows the arrangement of a plurality of detection units on an airplane.

FIG. 7 shows a $5 \times 5$ array of detector elements.

DETAILED DESCRIPTION OF THE PREFERRED EMBODIMENTS

In order to determine the direction of the laser radiation 7, which can enter over the entire sphere, the entire sphere is subdivided into six regions.

Figure 1:
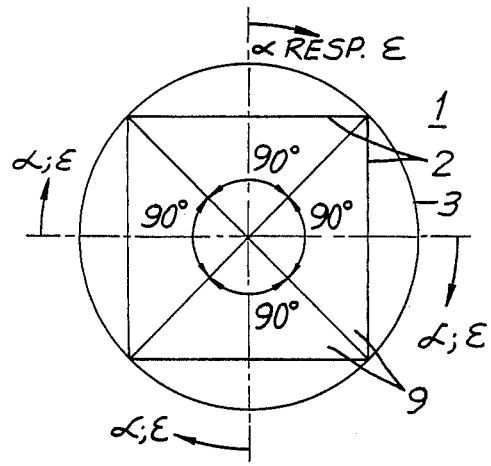
FIG. 1 is a sectional view in azimuth (respectively, elevation) through the solid sphere and a cube inscribed in the sphere for the purpose of subdivision.

The solid angle of the six regions correspond to the six side faces 2 of the cube 1. The corresponding great circle of the sphere is accordingly subdivided in azimuth and elevation into four 90-degree sections, as illustrated in FIG. 1. Each of the six regions is further subdivided into $5 \times 5$ subregions each being 18° azimuth and elevation. An arrangement as shown in FIG. 2 is used as direction detector for each of the six regions. The detector comprises in principle a diaphragm 4 with a quadrate, in particular, a square, window, a detector array 5 comprising $n_D \times n_D$ detector elements 6 as well as associated processing electronics (not shown in the drawings). The variable $n_D$ is preferably set equal to three. If the array dimensions $x_M$ and $y_M$ in the x and y directions are respectively defined as a multiple $n_M$ of the detector diminsions $x_D$ and $y_D$ respectively, that is, $x_M = n_M \cdot x_D$ and $y_M = n_M \cdot y_D$, then the predetermined window dimensions $x_B$ and $y_B$ are given by the relations $x_B = n_B \cdot x_D$ and $y_B = n_B \cdot y_D$ for the purpose of maintaining uniform discriminating intervals, wherein $n_B = n_M + n_A - 1$ and $n_A = (n_M - n_D)/2$ for the $3 \times 3$ array. The variable $n_A$ represents the relationship of the interval $x_A$ between detector elements and $x_D$. A corresponding relationship applies in the Y direction. The invention is not limited to this embodiment. For other values of $n_D$, corresponding measures apply.

The square window of diaphragm 4 allows passage of a square cross section of the incoming laser radiation. The position of the middle point of this cross section in the detecting plane parallel to the diaphragm plane is a measure of the laser radiation direction. FIG. 2A depicts the case where $\alpha = \epsilon = 0$ degrees. With an angle of incidence of the laser radiation 7 such that azimuth $\alpha = 0$ and elevation $\epsilon = 0$, the cross section 8 of the laser radiation covers all nine detector elements 6, that is, elements a–i. Each of the detector elements is connected to a logic circuit. In response to all of the detector elements being activated, the directional data $\alpha = \epsilon = 0$ degrees is recorded by the logic circuit.

FIG. 2b depicts the arbitrary case wherein $\alpha = 0$ degrees, $\epsilon = 17$ degrees. The cross section 8 of the laser radiation is correspondingly displaced, so that the detector elements 6, that is, elements d–i, supply directional data signals with the precision to be discussed below.

FIG. 2c depicts the boundary case where $\alpha = 0$ degrees, $\epsilon = 45$ degrees. In this case none of the detector elements are activated, while shortly before, that is, when $\alpha = 0$ degrees, $\epsilon = 44$ degrees, elements g, h and i each supply a signal.

Corresponding cases apply for arbitrary values of angles $\alpha$ and $\epsilon$ smaller than or equal to 45 degrees. A precise study of this arrangement shows that five ranges of the azimuth and elevation angles can be descriminated. Consequently, a directional resolution of $90/5 = 18$ degrees in azimuth and elevation is possible.

Figure 3:
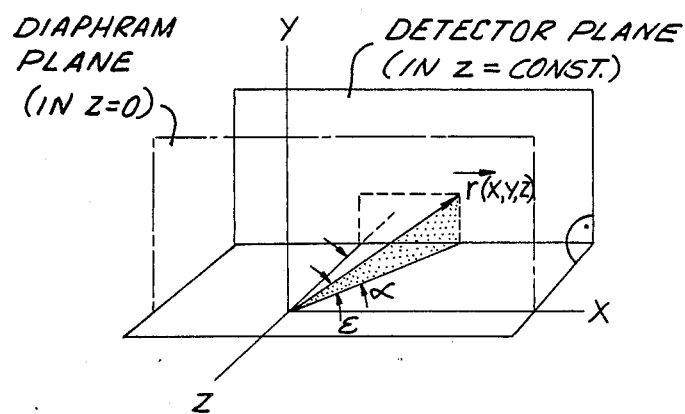
FIG. 3 shows the coordinates of the direction vector connecting the middle point of the diaphragm with the middle point of the cross section of the laser radiation taken in the plane of the detector array.

The direction vector $\vec{r}$ from the middle point of the diaphragm 4 to the middle point of the cross section 8 of the laser radiation in the plane of the detectors, depicted in FIg. 3, is defined by the relationships:

$$\vec{r} = (x^2 + y^2 + z_2)^{\frac{1}{2}}$$

$$\tan \alpha = x/z$$

$$\tan \epsilon = y/(x^2 + z^2)^{\frac{1}{2}}$$

wherein x, y and z are the coordinates of the direction vector.

The nonlinear relationship between $\alpha$ and x, that is between x and y on the one hand and $\epsilon$ on the other hand, causes a certain, yet relatively small deviation of the corresponding solid angle interval from the desired theoretical value mainly in the diagonal peripheral area of the array formed by the plurality of detector elements 6. This can, for example, be corrected by altering the height $y_D$ and width $x_D$ (FIG. 2c) of all detector elements 6 arranged at the corners of the array. A second possibility entails extending the array by adding four additional detector elements along the two diagonals.

Ultimately, a 5×5 element array can be employed. Such a 5×5 array is depicted in FIG. 7, with detector elements 6 being designated by letters a through y. With such an array, $(2 \cdot 5 - 1)^2 = 81$ solid angle intervals can be discriminated if the size of the diaphragm conforms to the size of the 5×5 element array. However, if the window size corresponds to that used with the 3×3 element array, $(2 \cdot 3 - 1)^2 = 25$ solid angle intervals can be discriminated as before, but now the $\alpha$ and $\epsilon$ corrections are inherently realized by the extension of the detector arrangement. For the sake of completeness, it should be mentioned that a detector array can be employed in which the interval between elements is not, as indicated in FIG. 2, equal to the element dimension, but rather equal to $n_A \cdot x_D$ and $n_A \cdot y_D$ respectively, where $n_A < 1$ or substantially greater than one.

The above described concept of direction detection by means of a detector array and a diaphragm having a window of a size relatively greater than that of an individual detector element makes it possible to discriminate relatively many solid angle intervals (that is, $(2n_D - 0.1)^2$) without discontinuity using an $n_D \times n_D$ array of relatively small detector elements.

Figure 4B:
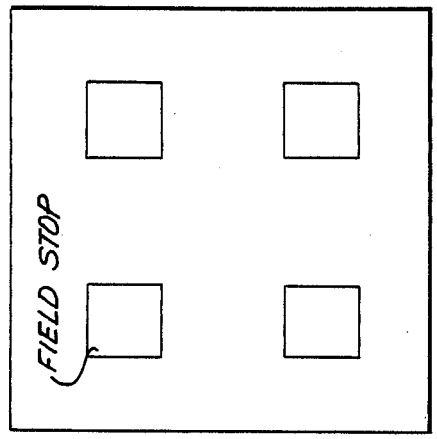
FIG. 4b shows a front view of a four-channel array.
Figure 4A:
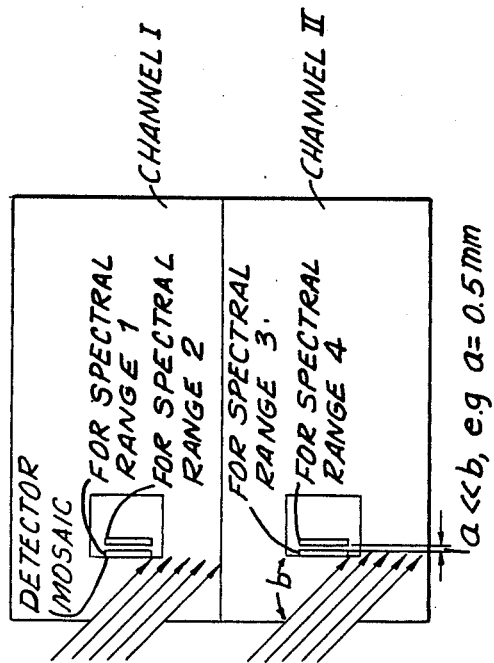
FIG. 4a shows a side view of a two-channel array, each channel having a two-color sandwich.

The diaphragm 5, which here serves the function of a lens, need not be greater in size than the detector array itself. Therefore for different spectral ranges (not diagrammatically depicted) a plurality of channels can be constructed relatively close to each other, so that different types of lasers can be detected. In order to reduce the number of different wavelength range channels, a so-called two-color array in a sandwich construction is used for every two ranges. The interval a (see FIG. 4a) between two chips amounts in this case to, for example, 0.5 mm, so that the above-described concept, according to which a predetermined interval b between the detector and diaphragm planes must be provided, can also apply in this sandwich arrangement, whereby for the corresponding construction of the array dimensions this interval b is great in comparison to the 0.5-mm interval between sandwich chips.

As mentioned at the outset, the arrangement according to FIg. 2 is intended to cover one of the six regions into which the sphere is divided. In order to monitor all six regions, either six similar sectors 9 can be installed on the six sides of an airplane, for example, or a different number of sectors, for example, up to five, can be combined in a single instrument, which then cover five sides of the aforementioned cube. The embodiment with six sectors mounted on an airplane 12 is depicted in a side view in FIG. 6. Only five sectors 10a through 10e are visible in this view, the sixth sector on the left side of the plane being hidden. The embodiment with five sectors mounted as a single instrument is depicted in the perspective view of FIG. 5. Only three sectors 10a, 10b and 10c are visible in this view, each with a 2×2 array of detector elements 6. The opposing installed instrument can then comprise not only the sixth still missing sector, but also four additional sectors which, in common with the first five-unit instrument, provide redundant monitoring.

The above-described concept for radiation detection without utilizing a radiation focusing lens assumes that the sensitivity of the individual detector elements is sufficient to convert a predetermined amount of impinging radiation energy from the laser beam source into a signal.

In practice, the path of the laser radiation 7 between the diaphragm 4 and the array of detector element 6, which are found, for example, inside the airplane, can be bridged by a correspondingly arrayed fiber optic bundle. Using this technique allows the radiation to be directed to an arbitrarily arranged central instrument and achieves another space-saving, so that the processing electronics can be located after the central instrument.

What is claimed is:

1. A system for detecting laser radiation, comprising processing electronics coupled to a plurality of detection units arranged on an object to be protected such that panoramic detection of laser radiation is possible, each detection unit detecting laser radiation in a sector-shaped solid angle and comprising:

(a) a first array of fixed detector elements arranged in a plane, each detector element of said first array being capable of generating a signal in response to the impingement of laser radiation in a first predetermined wavelength range thereon; and (b) a diaphragm for defining the field of vision of said detection unit, the diaphragm having a quadrate window of a size substantially equal to the size of said first array and lying in a plane substantially parallel to the plane of said first array and displaced therefrom, wherein said diaphragm and said first array are arranged so that a direction of laser radiation passing through said window can be determined by said processing electronics in dependence on which of said plurality of detection units has laser radiation impinging on at least one detector element of its first array and in dependence on the pattern of said detector elements having laser radiation impinging thereon.

2. The detection system as defined in claim 1, wherein the number of detection units in said plurality is five and each of said first arrays of detector elements is arranged on a corresponding face of a cube.

3. The detection system as defined in claim 1, wherein the number of detection units in said plurality is six and each of said first arrays of detector elements is arranged at a corresponding one of six locations on said object and perpendicular to and facing a corresponding one of six directions, said six directions being the directions along three mutually perpendicular axes.

4. The detection system as defined in claim 1, wherein said first array of detector elements comprises first, second and thirds rows and first, second and third columns of detector elements.

5. The detection system as defined in claim 4, wherein said first array has 3×3 detector elements.

6. The detection system as defined in claim 4, wherein said first array has 5×5 detector elements.

7. The detection system as defined in claim 4, wherein adjacent detector elements in each row are separated by a first predetermined interval and adjacent detector elements in each column are separated by a second predetermined interval.

8. The detection system as defined in claim 5, wherein each corner detector element of said 3×3 element first array has an edge length equal to the edge length of the other detector elements is said first array.

9. The detecting system as defined in claim 4, wherein said first array of detector elements further comprises first and second additional detector elements arranged along a first diagonal formed by said detector elements in said rows and columns, and third and fourth additional detector elements arranged along a second diagonal formed by said detector elements in said rows and columns.

10. The detection system as defined in claim 1, wherein each of said detection units further comprises a second array of detector elements capable of generating a signal in response to the impingement of laser radiation in a second predetermined wavelength range.

11. The detection system as defined in claim 10, wherein said first and second arrays of detector elements are arranged in a sandwich construction.

12. The detection system as defined in claim 10, wherein said first and second arrays of detector elements are arranged in the same plane to form corresponding channels for respectively recieving laser radiation of said first and second wavelength ranges.

13. The detection system as defined in claim 11, wherein the distance separating said first and second arrays is small compared to the distance separating said diaphragm and said first array.

14. The detection system as defined in claim 13, wherein said first and second arrays of detector elements are constructed as first and second chips, respectively, the thickness of said chips being such that said first and second arrays are separated by a distance substantially equal to 0.5 mm.

15. The detection system as defined in claim 1, wherein the number of rows of detector elements equals $n_D$, the number of columns of detector elements in said first array also equals $n_D$, and the number of solid angle intervals which can be discriminated by said system is $(2n_D-1)^2$.

16. A system for detecting laser radiation, comprising processing electronics coupled to a detection unit arranged on an object to be protected such that detection of laser radiation is possible, said detection unit detecting laser radiation in a sector-shaped solid angle and comprising:
 (a) an array of fixed detector elements arranged in a plane, each detector element of said array being capable of generating a signal in response to the impingement of laser radiation in a first predetermined wavelength range thereon; and
 (b) a diaphragm for defining the field of vision of said detection unit, the diaphragm having a quadrate window of a size substantially equal to the size of said array and lying in a plane substantially parallel to the plane of said array and displaced therefrom,
 wherein said diaphragm and said array are arranged so that a direction of laser radiation passing through said window can be determined by said processing electronics in dependence on the pattern of said detector elements having laser radiation impinging thereon.

17. A system for detecting laser radiation, comprising processing electronics coupled to a detection unit arranged on an object to be protected such that detection of laser radiation is possible, said detection unit detecting laser radiation in a sector-shaped solid angle and comprising:
 (a) an array of fixed detector elements arranged in a plane, each detector element of said array being capable of generating a signal in response to the impingement of laser radiation in a first predetermined wavelength range thereon; and
 (b) a diaphragm for defining the field of vision of said detection unit, the diaphragm having a quadrate window having a length and width which are respectively substantially equal to the length and width of said array and lying in a plane substantially parallel to the plane of said array and displaced therefrom,
 wherein said diaphragm and said array are arranged so that a direction of laser radiation passing through said window can be determined by said processing electronics in dependence on the pattern of said detector elements having laser radiation impinging thereon.

* * * * *